March 8, 1938.  E. H. J. C. GILLETT  2,110,265
FRICTION CLUTCH
Filed Jan. 20, 1936
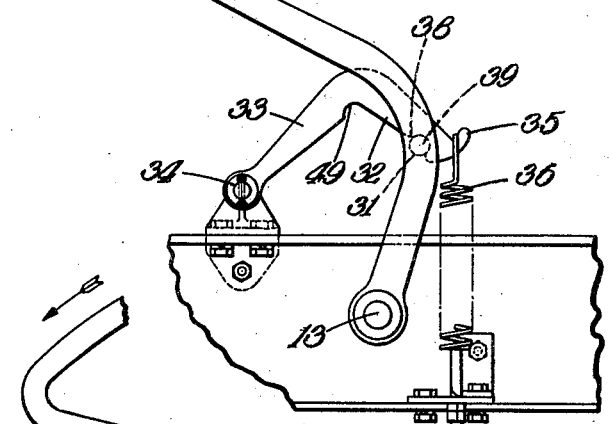
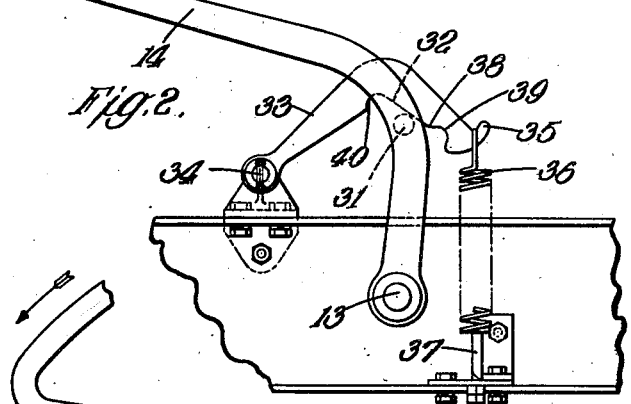
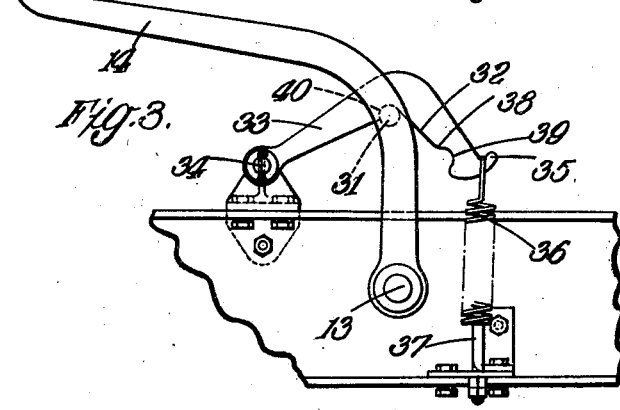
Inventor
E. H. J. C. Gillett
by Wilkinson &
Mawhinney
Attorneys.

Patented Mar. 8, 1938

2,110,265

UNITED STATES PATENT OFFICE 2,110,265

FRICTION CLUTCH

Edward Henry James Cecil Gillett, Cannon Hill, London, England

Application January 20, 1936, Serial No. 59,983 In Great Britain January 21, 1935

2 Claims. (Cl. 192—99)

The present invention relates to friction clutches more particularly for the driving transmission of motor vehicles.

The invention refers to clutches of the kind which are biased to engaged position and are disengageable by the application of force to a control member, such as the ordinary pedal or a lever or the like actuated by a power clutch operator.

The general object of the invention is to reduce the operating load which must be applied for disengaging the clutch and this is more especially desirable for heavy commercial road vehicles, rail locomotives with internal combustion engines and "cross country" vehicles, with either wheels or endless flexible tracks or a combination thereof.

In the ordinary clutch only a small part of the travel of the shifting member is taken up by the actual engaging and disengaging, the major part of the travel being taken up in establishing a sufficient clearance between the plates or other engaging members when these are disengaged. Now the full pressure of the engaging means is only required for the engagement itself, i. e. when the plates are actually in contact.

More particularly, the invention relates to clutch-operating mechanism comprising counter-spring means opposed to the clutch-engaging force and so operating that when the clutch members are in contact or nearly so the shifting member receives substantially the full engaging force, but as the shifting member is withdrawn the counter-spring opposes the engaging force with progressively greater leverage. The arrangement is such that in all positions the engaging force more than balances the counter-spring so that there is throughout the movement a net positive engaging force on the shifting member. In such an arrangement there is transfer of potential energy from the counter-spring to the engaging means as the shifting member is moved in the clutch-disengaging direction and vice versa.

According to the present invention, in clutch-operating mechanism having a counter-spring arranged to oppose the clutch-engaging means at least throughout the greater part of the stroke of the pedal or other clutch control member, the counter-spring is connected to a lever pivoted at a fixed point and having a cam face engaging a stud or the like carried by the control member, the said cam face being so shaped that the total clutch-engaging load diminishes progressively as disengagement proceeds.

The above described arrangements relieve the load on the control member throughout the idle range of movement of the shifting member to a great extent but the initial load required in disengaging the clutch is not substantially affected thereby.

Preferably, the "dead-point" cam mechanism is arranged to occur when the control member has been withdrawn from the fully engaged position, so that in the latter position the counter-spring means are not opposing the engaging means but acting on the control member in the same direction as the engaging means.

This arrangement is a useful safeguard against "clutch-riding" as the driver must exert an additional initial pressure on the pedal to get the counter-spring over the dead-point.

Further the cam face preferably includes one or more notches or projections engageable by the stud on the control member and operating as stop means limiting the movement of the control member in one or both directions.

This eliminates the necessity for a floor stop for the clutch pedal when fully disengaged and prevents the shank of the pedal fouling the underside of the floor boards in the engaged position.

The nature of the invention and in what manner it may be performed will be more fully understood from the following description with reference to the accompanying drawing, of which:—

Figs. 1 to 3 show in side elevation an embodiment of the invention, in three different positions.

Referring to Figs. 1 to 3; a control member 14 terminating in the usual pedal, mounted direct on the shaft 13 of the withdrawal fork (not shown) carries a stud or roller 31 which is engaged by a cam surface 32 formed on a lever 33 pivoted at a fixed point 34 and having a hook 35 at its end which is engaged by a tension counter-spring 36 secured to a fixed anchorage 37.

The cam surface 32 is shaped to give progressively increasing effective leverage to the spring 36 as the control member is moved towards the fully disengaged position and includes a slight "hump" at 38. As the spring 36 is most fully extended when the stud 31 passes the hump 38 this constitutes the dead-point of the counter-spring; this dead-point occurs just before the control member reaches the fully engaged position.

The cam surface 32 terminates at both ends in notches 39, 40 which receive the stud 31 and act as stops limiting the travel of the control member in both directions.

Figs. 1 and 3 show the arrangement in the fully engaged and fully disengaged positions respectively and Fig. 2 shows an intermediate position.

Having now particularly described and ascertained the nature of my said invention and in what manner the same is to be performed, I declare that which I claim is:—

1. In a motor vehicle, a clutch, clutch-engaging means, a clutch-disengaging member, a counter-spring and means between the disengaging member and the counter-spring for transmitting the force of the latter to the former with increasing effective leverage, in the sense opposing the engaging means, as the disengaging member is moved in the disengaging direction, at least over the greater part of the travel of the disengaging member; said last named means including a lever pivoted at a fixed point and connected to the counter-spring, a cam face on said lever and a cam-contacting element on the disengaging member, and said cam face being so shaped that when the clutch is fully engaged the counter-spring assists the clutch engaging means to maintain engagement and that when the disengaging member has been moved a short distance in the clutch disengaging direction the cam-contacting element passes a "dead point" on the cam face, at which point the reaction of the cam face on the disengaging member is reversed, thereafter opposing the engaging means throughout the remainder of the travel of the disengaging member in the clutch disengaging direction.

2. In a motor vehicle, a clutch, clutch-engaging means, a clutch-disengaging member, a counter-spring and means between the disengaging member and the counter-spring for transmitting the force of the latter to the former with increasing effective leverage, in the sense opposing the engaging means, as the disengaging member is moved in the disengaging direction, at least over the greater part of the travel of the disengaging member; said last named means including a lever pivoted at a fixed point and connected to the counter-spring, a cam face on said lever and a cam-contacting element on the disengaging member, said lever having means for engaging said cam-contacting element and limiting its travel relative to the cam face in at least one direction.

EDWARD HENRY JAMES CECIL GILLETT.